(12) United States Patent
Wang et al.

(10) Patent No.: US 12,483,160 B2
(45) Date of Patent: Nov. 25, 2025

(54) MULTIPLE AND SINUSOIDAL PULSE WIDTH MODULATION FOR WIRELESS CHARGING

(71) Applicant: NXP USA, Inc., Austin, TX (US)

(72) Inventors: Dechang Wang, Suzhou (CN); Wei Cao, Suzhou (CN); Xiang Gao, Shanghai (CN)

(73) Assignee: NXP USA, Inc., Austin, TX (US)

( * ) Notice: Subject to any disclaimer, the term of this patent is extended or adjusted under 35 U.S.C. 154(b) by 903 days.

(21) Appl. No.: 17/658,348

(22) Filed: Apr. 7, 2022

(65) Prior Publication Data

US 2022/0329177 A1    Oct. 13, 2022

(30) Foreign Application Priority Data

Apr. 12, 2021 (CN) .......................... 202110391694.6

(51) Int. Cl.
*H02J 50/12* (2016.01)
*H02M 7/5395* (2006.01)

(52) U.S. Cl.
CPC ........... *H02M 7/5395* (2013.01); *H02J 50/12* (2016.02)

(58) Field of Classification Search
USPC .................. 320/106, 107, 108, 109, 110
See application file for complete search history.

(56) References Cited

U.S. PATENT DOCUMENTS 10,135,498 B2    11/2018    Park et al.
2019/0305596 A1   10/2019   Mantha et al.

FOREIGN PATENT DOCUMENTS

| CN | 110707906 A | 1/2020 |
| EP | 2779359 A2 | 9/2014 |
| KR | 20080110627 A * | 12/2008 |
| KR | 20190105480 A * | 9/2019 |
| WO | WO-2019172535 A1 * | 9/2019 ............. H02J 50/80 |

OTHER PUBLICATIONS

Yan, et al., "A Double-Modulation-Wave PWM for Dead-Time-Effect Elimination and Synchronous Rectification in SiC-Device-Based High-Switching-Frequency Converters", IEEE Transactions on Power Electronics, Dec. 1, 2020, pp. 13500-13513, vol. 35, No. 12, IEEE, Piscataway, NY, USA.

* cited by examiner

*Primary Examiner* — Brian Ngo

(57) ABSTRACT

Transferring wireless power using a multiple pulse width modulation M-PWM driver signal includes generating the multiple PWM driver signal such that the pulse width varies in accordance with the magnitude of a periodic modulating curve. The M-PWM driver signal adjacent a zero-crossing of the periodic modulating wave is modified by reducing an interval between the zero-crossing and at least one pulse of the M-PWM driver signal closest to the zero-crossing. The modified M-PWM driver signal is used to open and close a switch in a wireless power transfer charging circuit.

23 Claims, 8 Drawing Sheets

MULTIPLE AND SINUSOIDAL PULSE WIDTH MODULATION FOR WIRELESS CHARGING

CROSS-REFERENCE TO RELATED APPLICATIONS

This application claims the priority under 35 U.S.C. § 119 of China application no. 202110391694.6, filed on 12 Apr. 2021, the contents of which are incorporated by reference herein.

FIELD

The present disclosure relates to inverters and methods therefor, and in particular to multiple or sinusoidal pulse width modulation for inverters in applications such as wireless charging.

BACKGROUND

Multiple pulse width modulation (M-PWM) and in particular sinusoidal pulse width modulation (S-PWM) are of interest in various fields of application of inverters such as wireless charging, digital power supplies and motor control. M-PWM relates to a variant of PWM in which the width of the pulses is varied in a periodic fashion, corresponding to a modulating waveform. A particularly important modulating waveform is a sinusoidal wave, since this is characteristic of alternating current (AC) power supply. In S-PWM, the width of the pulses of the PWM varies according to a sine curve. This can result in the average current in the digital PWM signal varying in line with the modulating wave.

Although a sine curve itself has very clear "zero-crossings" that is to say points at which the polarity changes between positive and negative, use of a M-PWM or S-PWM signal in wireless power transfer may result in the receiver waveform having additional or spurious zero-crossings: since the power and/or current levels are low and approaching zero towards each polarity change in the modulating wave, the voltage across the receiving coil may "bounce" either side of zero close to the expected zero-crossing. It would be desirable to reduce or minimise or even completely avoid such spurious zero-crossings or polarity changes.

SUMMARY

According to a first aspect of the present disclosure there is provided a method for wireless power transfer using a multiple pulse width modulation, M-PWM, driver signal, comprising: generating the multiple PWM driver signal wherein the pulse width varies in accordance with the magnitude of a periodic modulating curve; modifying the M-PWM driver signal adjacent a zero-crossing of the periodic modulating wave, by reducing an interval between the zero-crossing and at least one pulse of the M-PWM driver signal closest to the zero-crossing; and using the modified M-PWM driver signal to open and close a switch in a wireless power transfer charging circuit. By reducing an interval between the zero-crossing and the at least one pulse of the M-PWM driver signal close to the zero-crossing, energy, which is transferred to a coil in a receiving device by means of wireless power transfer from the wireless charging circuit having an inverter which comprises the switch, may be increased relative to the unmodified current resulting from an unmodified M-PWM driver signal. The increase in energy transfer may prevent the voltage across the coil in the receiving device changing polarity multiple times or undergoing spurious zero-crossings near to the true zero-crossing In one or more embodiments, the at least one pulse of the M-PWM driver signal closest to the zero-crossing, comprises a first pulse subsequent to the zero-crossing.

In other embodiments, the at least one pulse of the M-PWM driver signal closest to the zero-crossing comprises both a last pulse prior to the zero-crossing and a first pulse subsequent to an immediately preceding zero-crossing. In such embodiments, modifications to the M-PWM signal occurs both close to the start and close to the end of a modulating curve half-cycle In one or more embodiments, the periodic modulating curve is a sinusoidal curve and the multiple PWM signal is a sinusoidal PWM, S-PWM, signal. S-PWM signals are the most common and well-known form of M-PWM signals, since the sinusoidal shape generally follows a conventional alternating current signal most suited for applications such as wireless power transfer or other inductively coupled circuits.

In one or more embodiments, reducing an interval between the zero-crossing and a pulse of the M-PWM driver signal closest to the zero-crossing comprises broadening a width of the pulse closest to the zero-crossing. Broadening the width of this pulse may increase the in energy available for transfer. In one or more such embodiments, broadening the width of the pulse closest to the zero-crossing comprises symmetrical broadening about its un-broadened state, and this may be generally preferred. In other embodiments, the broadening may be asymmetrical. In particular, broadening the final pulse asymmetrically whereby the pulse is widened to a greater extent close to the zero-crossing may have an effect of limiting the perturbation of the overall sinusoidal shape of the currents provided to the coil. This in turn may reduce undesired side-effects such as increases in EMI.

In one or more other embodiments, reducing an interval between the zero-crossing and a pulse of the M-PWM driver signal closest to the zero-crossing comprises adjusting the timing of the pulse closest to the zero-crossing. In yet other embodiments, reducing an interval between the zero-crossing and a pulse of the M-PWM driver signal closest to the zero-crossing comprises exchanging the pulse closest to the zero-crossing with an off-time immediately adjacent the zero-crossing. Particularly in the case of a digital controller implementing the method, this form of the modification may be particularly simple to implement.

In one or more still further embodiments, reducing an interval between the zero-crossing and a pulse of the M-PWM driver signal closest to the zero-crossing comprises introducing an additional pulse in an off-time immediately adjacent the zero-crossing.

In one or more embodiments, the method further comprises using an inverse of the modified M-PWM driver signal to open and close a second switch in the wireless power transfer charging circuit. In general, for S-PWM modification of the current in the charging circuit, a pair of switches are operated in opposition, or inversely to each other.

In one or more embodiments, the method comprises applying one of the methods mentioned above for a first half-cycle of the modulating curve, and for the entirety of an immediately subsequent half-cycle of the modulating curve, keeping the first switch open. In such embodiments, during the immediately subsequent half-cycle of the modulating curve the second switch may be kept closed. In other embodiments, the first and second switches are each opened and closed, according to the modified S-PWM or M-PWM driver signal and its inverse respectively, whilst third and fourth switch are held open and closed respectively for the first half-cycle and held closed and open respectively for the second half-cycle.

In one or more embodiments, the wireless power transfer charging circuit comprises an inverter, and the switch is comprised in the inverter.

According to a second aspect of the present disclosure, there is provided a controller for a wireless power charging circuit, the wireless power charging circuit comprising an inverter, wherein the controller is configured to generate a sinusoidal PWM, S-PWM, driver signal wherein the pulse width varies in accordance with the magnitude of a periodic modulating curve; and modify the S-PWM driver signal adjacent or close to a zero-crossing of the periodic modulating wave, by reducing an interval between the zero-crossing and at least one pulse of the M-PWM driver signal closest to the zero-crossing.

According to one or more embodiments, the controller for a wireless power charging circuit further comprises a driver circuit configured to use the modified M-PWM driver signal to open and close a switch in a wireless power transfer charging circuit.

According to a yet further aspect of the present disclosure, there is provided an inverter for a wireless power charging circuit, comprising: a controller as mentioned above and the switch. The invertor may comprise a single chip or integrated circuit, or may be provided across two or more chips or integrated circuits; for instance digital control parts of the invertor may be provided on a first chip such as an MCU chip and the switch may be provided as a separate discrete component such as a power transistor. The inverter may comprise for such switches. In other embodiments, the switches may be integrated into the same chip or integrated circuit as the controller. The controller or inverter may be configured to implement any of the methods described above.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
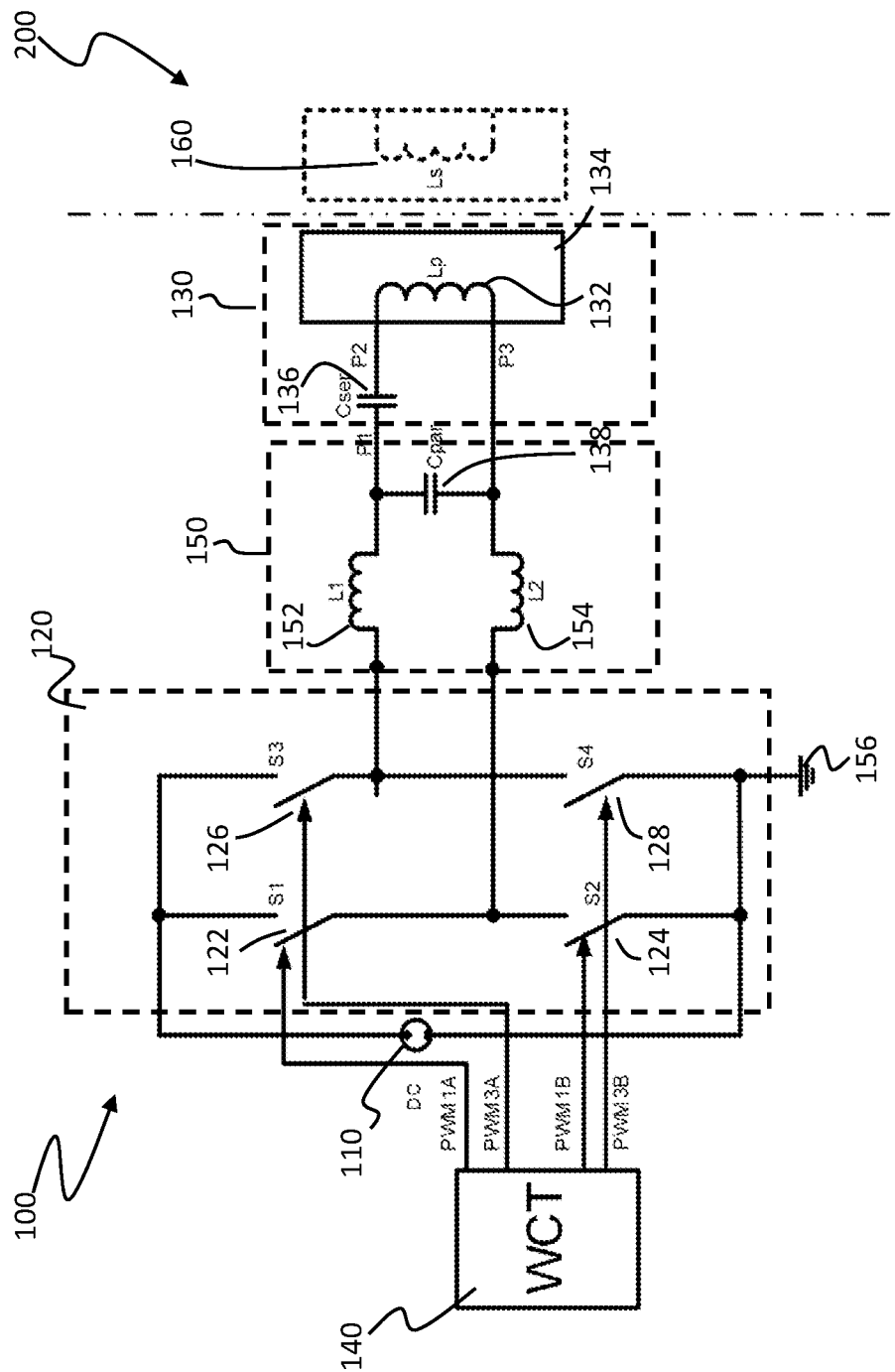
FIG. 1 illustrates schematically, a typical known wireless charging circuit and controller.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates, schematically, a typical wireless charging circuit, and controller. The circuit 100 comprises a DC power supply 110, an inverter 120, PI filter 150 and a resonance circuit 130. The inverter comprises four switches, S1 122, S2 134, S3 126 and S4 128, arranged in a full bridge configuration. The PI filter comprises two inductive coils L1 152 and L2 154, a capacitance Cpar, 138. The two input connections on the input side of the full bridge are connected across the DC power supply 110; the two output connections on the output side of the full bridge are connected one to each of the two inductive coils L1 and L2. One side of the DC power supply 110 is connected to ground 156 and thus may be termed the "low-side". The other side may be termed the "high-side".

The inverter 120 is connected to drive the resonance circuit 130, through either L1 or L2 in dependence on the switching state of the inverter. The resonance circuit 130 comprises an inductance in the form of a charging coil Lp 132, which is on, or typically embedded in, a charging pad 134. The resonant circuit is completed by a series capacitance Cser 136. Each of the above-mentioned inductances and capacitance takes the form of one or more individual inductor or capacitors respectively.

The switches S1 to S4 are typically transistors such as FETs. The switches are controlled, for example by controlling the gates of each FET, using four control signals from a controller 140. Two of these, PWM1A and PWM3A control the high-side switches; the other two control switches, PWM1B and PWM3B control the low-side switches.

Shown dotted in FIG. 1 is part of a circuit 200 which can be charged by means of charging circuit 100. In particular, the circuit 200 includes an inductive element 160, which may be positioned close to the charging coil, in order to inductively couple to it, and wirelessly transfer power from the charging circuit to the circuit 200.

Figure 2:
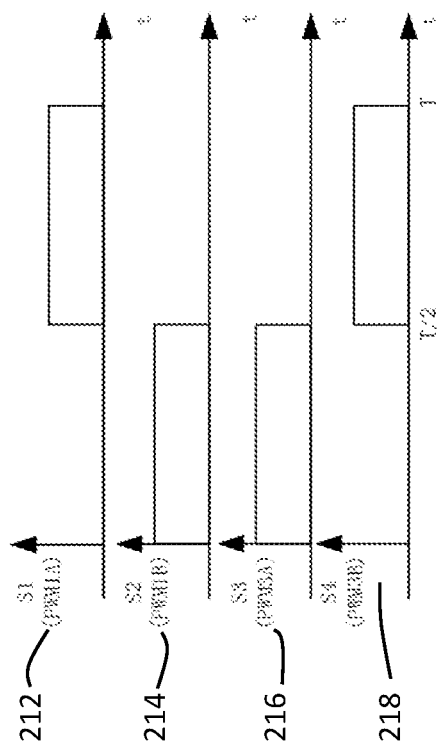
FIG. 2 illustrates switch control to provide an AC output by means of simple PWM.

Normal or simple PWM control for an inductor such as that shown in FIG. 1 is illustrated in FIG. 2. In order to ensure that the DC power supply is never shorted to the ground, at any instance only one of S1 and S2 can be "on" or conducting and only one of S3 and S4 can be "on or conducting. Thus the control signal PWM1A 212 for switch S1 is arranged to be complementary to the control signal PWM1B 214 for switch S2. That is to say S1 is conducting whenever S2 is not conducting, and vice versa. Similarly the control signal PWM3A 216 for switch S1 is arranged to be complementary to the control signal PWM3B 218 for switch S2. That is to say S1 is conducting whenever S2 is not conducting, and vice versa. The skilled person will be aware, that in some situations, the timing of switching of the switches may be adjusted a small amount to accommodate for finite and non-zero slew rates of the switches and to avoid consequential "shoot-through" or other problems associated with switching the two switches at exactly the same moment; however, that is not of particular concern for the present disclosure, so need not be discussed further herein.

The controller arranges for the switches to switch with a period T (and thus frequency 1/T); for a first part (or "pulse") of the switching cycle S1 is non-conducting and S2 is conducting; for the remainder of the switching cycle S1 is conducting and S2 is nonconducting. The PWM control is typically effected by adjusting the width of the first part or pulse whilst the switching cycle frequency or period is kept constant. Of course, given a fixed frequency, and a defined "on-time" of S2, it is not necessary that the "pulse" in S2 is at the start of each period—although for conventional PWM control that is generally used. Alternatively, the "pulse" could be at the end of the period. It could even occur during a middle part of the period—although this would require more complicated control, and so is typically not applied in conventional PWM. However, for sinusoidal PWM control such as that discussed hereinbelow, the "pulse" in S2 is, typically, not always at the start of the period, in order to maintain symmetry over a longer timescale (such as a "modulation period" as will be evident from the discussion hereinbelow relating to modulation frequency, and with reference to FIGS. 3 and 4).

The power supplied to the output depends on the width of the pulses, provided the DC power supply 110 supplies a fixed voltage. Thus, by sinusoidally varying the width of one or more pulses, it is possible to provide an AC output. This is illustrated in FIG. 3.

Figure 3:
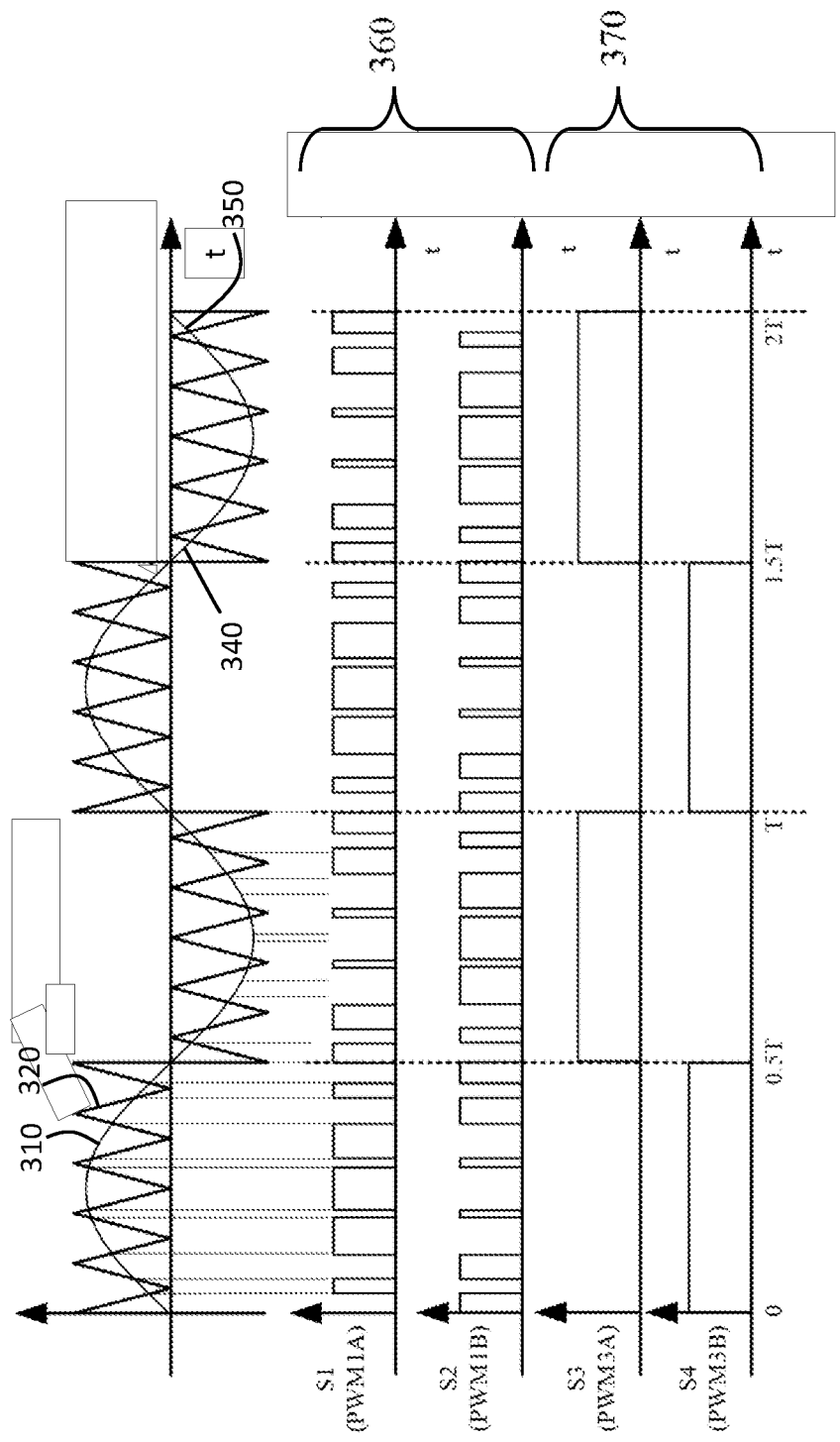
FIG. 3 illustrates switch control to provide an AC output by means of S-PWM.

FIG. 3 illustrates switch control to provide an AC output by means of S-PWM. In particular, control of switches S1 to S4 is shown in order to provide a sinusoidally AC output 310, also referred to as a modulating wave output. As shown, the modulation frequency of the output is 1/T. In this control, the switches S1 and S2 provide a so-called "high-frequency" half-bridge and switches S3 and S4 control a provide a "low frequency" half-bridge.

Consider first the high-frequency half-bridge. This half-bridge is switched using PWM control of a fixed frequency—in the illustrated example shown, this frequency is 10 times the modulation frequency, that the say the frequency is 10/T. The PWM frequency is also sometimes referred to as the "carrier frequency", and this is shown schematically in FIG. 3 by the triangular carrier wave 320.

It should be noted that the ratio between the modulation frequency and the carrier frequency for an application such as wireless charging is relatively small compared to inverters for other applications. Typically, inverters providing mains frequency outputs (e.g. 50 Hz or 60 Hz) operate with carrier frequencies in the range of 10 kHz to a few hundred kHz, to provide the mains frequency output—the ratio is then typically 200 to 2000. In contrast, in the shown example, which may be typical for an inverter providing an output having a modulation frequency of 100-200 kHz suitable for applications such as wireless charging, the carrier frequency may be 1-2 MHz, and there are thus only five pulses of the PWM control for each half-cycle of the modulation frequency.

As shown, the power supply to the output (and thus the height of the modulating wave) is proportional to the width of the conducting pulse in S1. Thus the width of the pulses could be calculated from the sinusoidal modulation curve (at time t according to $\sin(2\pi t/T)$.

Alternatively, a computationally simply method is shown, illustrated in FIG. 3. The triangular carrier wave is overlaid, that is to say compared with, the modulation curve: PWM1A is set to change state whenever the carrier wave crosses the modulation curve, (that is to say, the switch S1 is toggled between a conducting and a nonconducting state). And since the other switch—S2—in the half-bridge operates as the complement of S1 under control of PWM1B, this other switch toggles between a nonconducting and a conducting state. As a result, the voltage on the supply side of the inductor L2 is switched according to S-PWM switching, in order to drive the resonant circuit of the wireless charger. These switching control signals are shown in the middle two curves 360

Also shown in FIG. 3 at the bottom two curves 370 are the control signals—PWM3A for the third switch S3 and PWM3B for the fourth switch S4. These two switches form a second half-bridge, operated in 50% PWM at the relatively low frequency of the modulation curve. The relatively low switching frequency has the effect of periodically toggling the voltage on the input side of the inductor L1 between the supply voltage and ground, and enables the negative-going switching on negative side of the AC curve (that is to say the third and fourth quadrants 340 and 350).

Because, at any one time, the S-PWM is applied to just one (S1 and S2) of the half bridges and not to the other half bridge (S3 and S4) this type of operation is called unipolar PWM operation.

Figure 4:
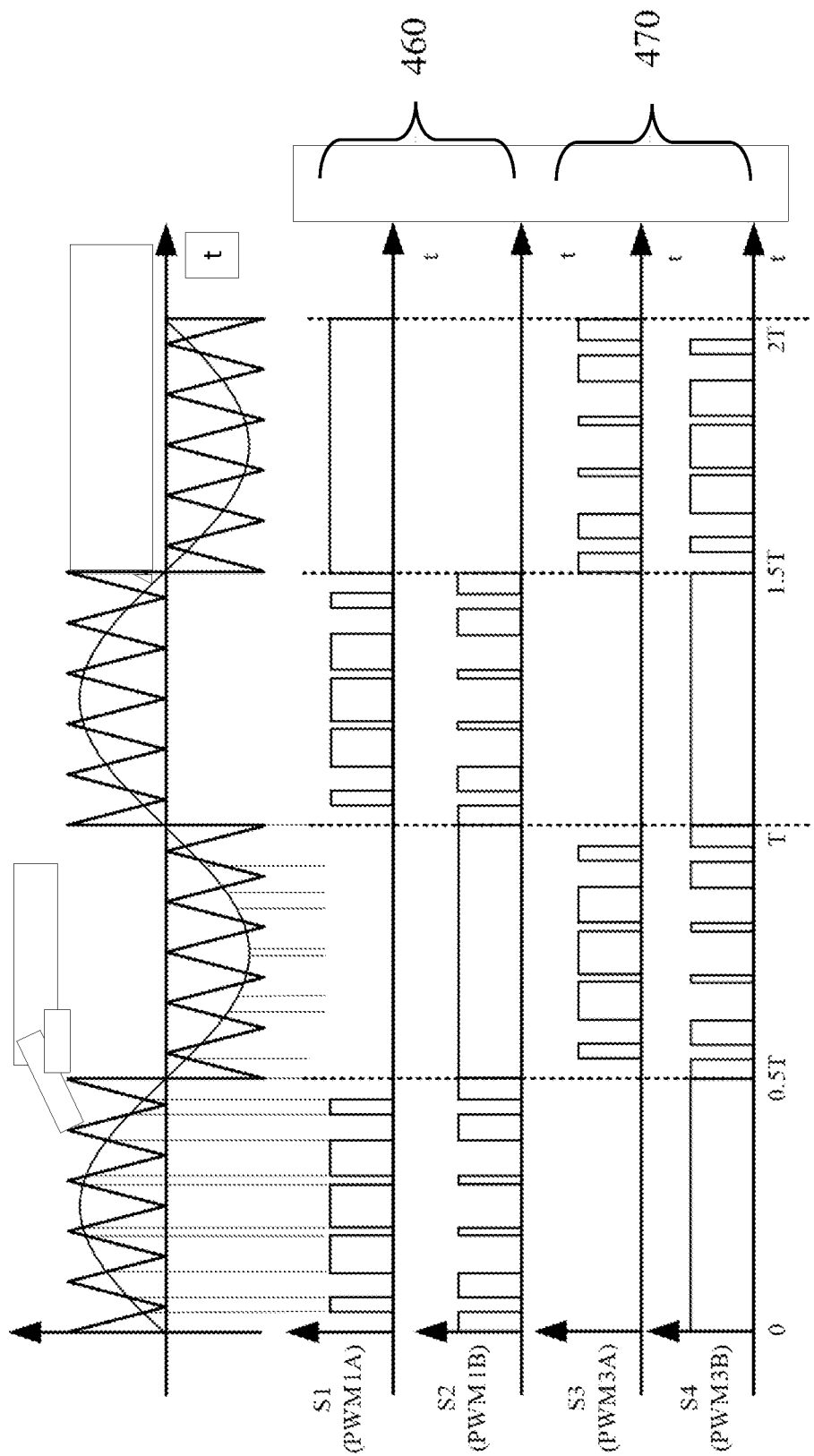
FIG. 4 illustrates an alternative mechanism for switch control to provide an AC output by means of S-PWM.

FIG. 4 shows an alternative driving arrangement for supplying unipolar S-PWM. This configuration is broadly similar to that shown in FIG. 3, however instead of having a "relatively high frequency" bridge S1 and S2 and a "relatively low frequency" bridge S3 and S4, in this configuration the switches S1 and S2 are viewed as a "left bridge" and switches S3 and S4 are viewed as a "right bridge": in this configuration the left bridge S1 and S2 operates under S-PWM control for the first two quadrants of the modulation curve, shown in the middle two curves 460, and the right bridge S3 and S4 operates under S-PWM control for the third and fourth quadrants of the modulation curve, as shown in the bottom two curves 470. Thus, as can be seen from the figure, switches S3 and S4 are in low-frequency mode for the first two quadrants, and S1 and S2 are in low-frequency mode for third and fourth quadrant.

Each of the operating modes shown in FIG. 3 and FIG. 4 have in common that during any quadrant of the modulating curve, one pair of switches corresponding to a first half-bridge is operating in S-PWM at the carrier frequency, and the other pair of switches corresponding to the other-half bridge is operating in simple PWM at the modulation frequency.

Figure 5:
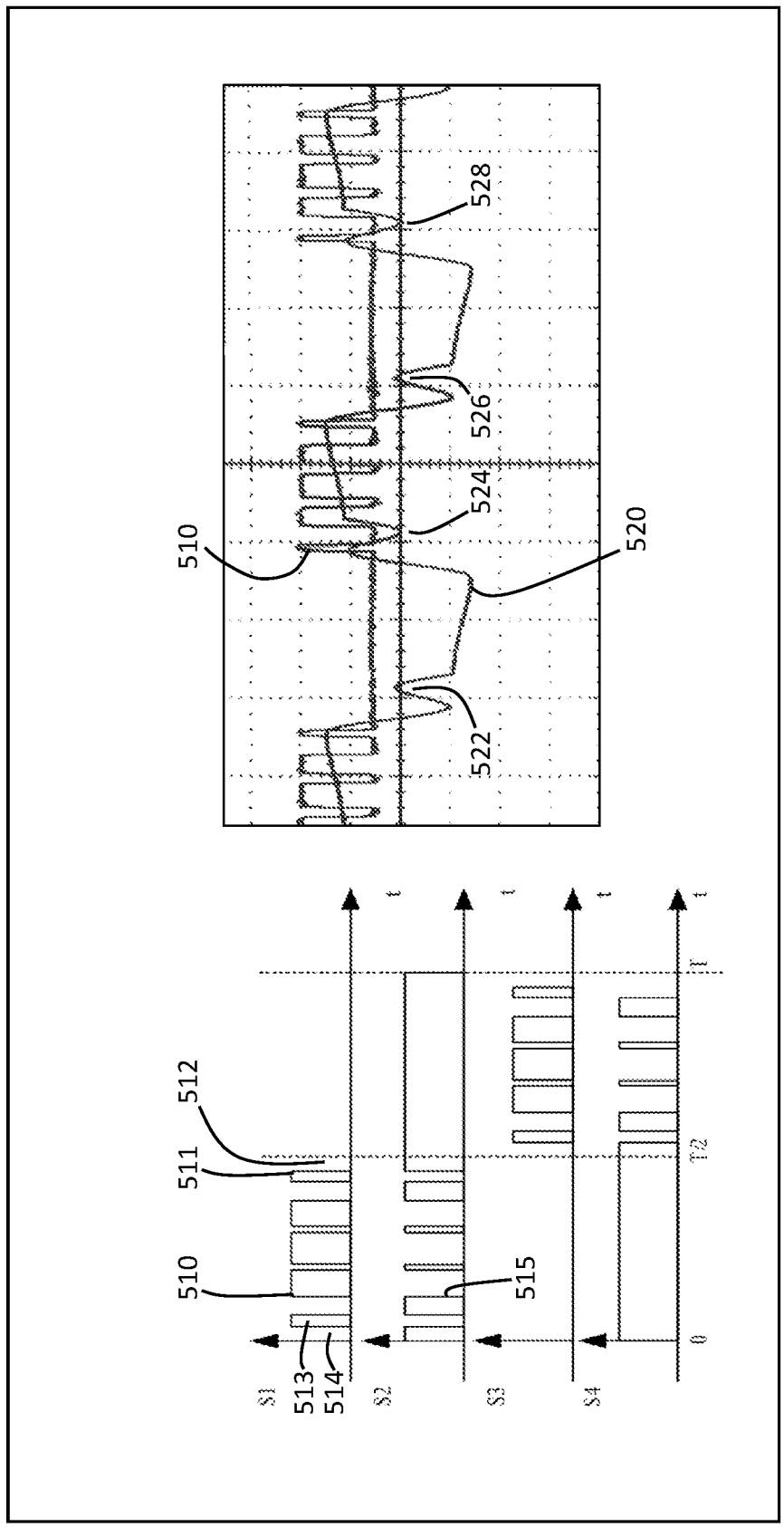
FIG. 5 illustrates switch control to provide an AC output by means of S-PWM, along with the voltage obtainable in a receiver coil of a wireless charging system wherein the transmitter coil is powered by currents driven by S-PWM.

FIG. 5 shows, on the left hand side, the S-PWM driver signals 510 and 515 for switches S1 and S2 respectively, over a complete cycle, that is to say a first half-cycle and then a second half-cycle, of the modulating wave, for a unipolar S-PWM system as shown in FIG. 4. During the first half-cycle, the width of the pulses of the drivers show the characteristic S-PWM variation, from a short first pulse 513 which follows a zero-crossing after an or off-time 514, the pulse width increasing to longer pulses in the middle of the half-cycle, and then decreasing back to a final short pulse 511 which precedes the end of the half-cycle by a deadtime or off-period 512. During the second half-cycle the driver signal for switch S1 is off, whilst the driver for switch S2 is on.

On the right-hand side are shown experimental measurements for the use of the S-PWM driver signal in transferring power from a charging device 100 to a receiving device or circuit 200. Trace 510 shows the S-PWM driver signal which opens and closes switch S1, whilst complimentary switch S2 is opened and closed in opposition to, or complementary to, S1 (not shown). The right-hand side of the figure also shows the resulting voltage 520 across the receiver inductor coil 160. During the first half-cycle, the voltage across the coil is generally positive and gradually increasing; during the second half-cycle, the voltage across the coil is generally negative and gradually becoming more negative. However, at the start of each of the half-cycles, there is a short interval during which the voltage falls back towards zero, and actually crosses zero, producing zero-crossings in addition to that corresponding to the change from the first half-cycle to the second half-cycle of the modulating wave. These spurious pairs of zero-crossings are shown at 522, 524, 526 and 528 on the right-hand side of FIG. 5. As mentioned, the additional zero-crossings are spurious, and are generally undesirable: for example, it is becoming of increasing interest to provide communication directly tied to the wireless charging signal itself. For instance, the modulating wave can itself be used for communication purposes. Information may be encoded onto the modulating wave by frequency shift keying (FSK) or other protocols. In order to demodulate the FSK data it is necessary to accurately measure the frequency of the modulating wave. This is straightforward provided that there are only two zero-crossings per cycle—the introduction of additional, spurious, zero-crossings adds to the complexity of the demodulation. It would thus be desirable to limit or completely avoid such spurious zero-crossings.

Figure 6:
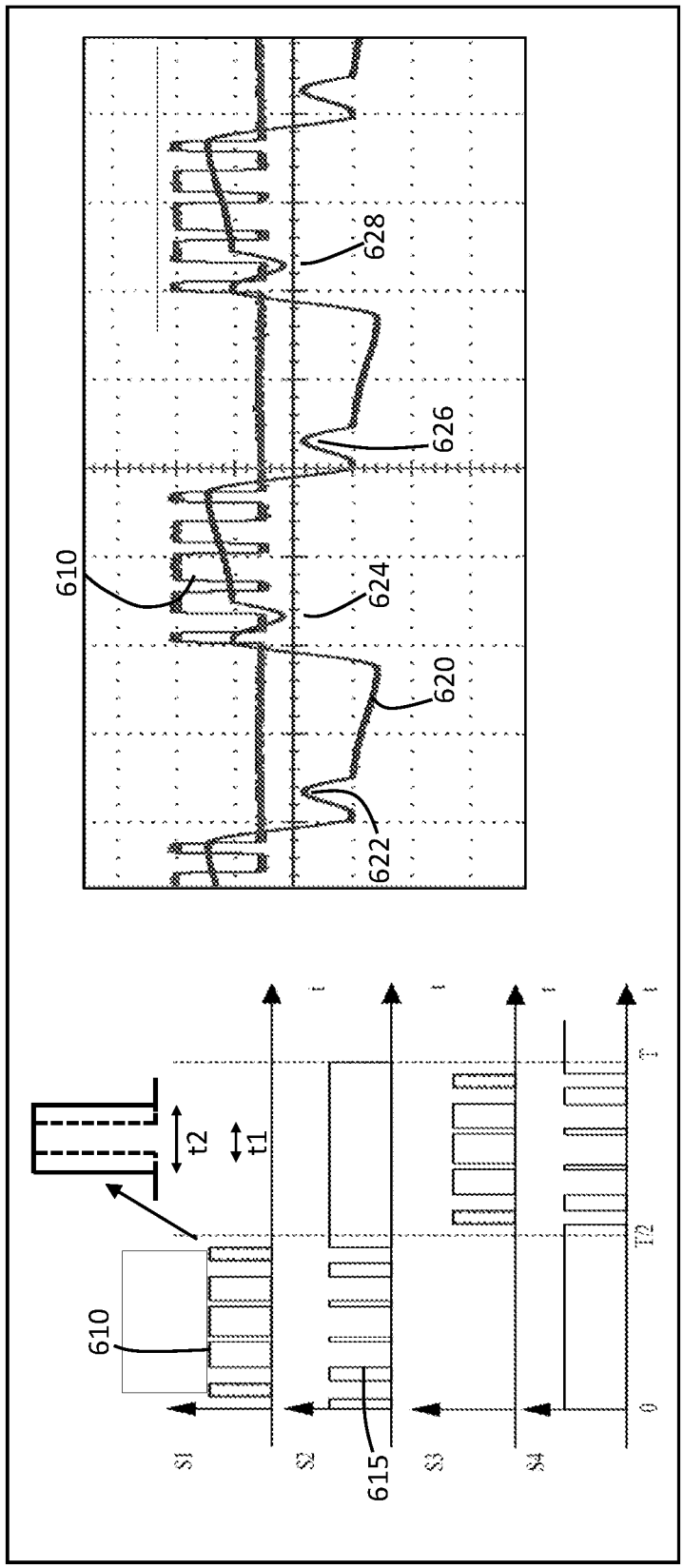
FIG. 6 illustrates switch control to provide an AC output by means of S-PWM, along with the voltage obtainable in a receiver coil of a wireless charging system wherein the transmitter coil is powered by current driven by a modified S-PWM according to one or more embodiments.

FIG. 6 shows, on the left-hand side, the S-PWM driver signals for S1 and S2, and on the right-hand side experimental measurements of S1 and the resulting voltage across the receiver coil, for a wireless charger operating according to one or more embodiments of the present disclosure.

Shown on the left-hand side, the S-PWM driver signals 610 and 615 for switches S1 and S2 respectively, are similar to those in the conventional method, over most of the modulating wave cycle. However, the M-PWM driver signal adjacent a zero-crossing of the periodic modulating wave is modified, by reducing an interval, or delay, between the zero-crossing and at least one pulse of the M-PWM driver signal closest to the zero-crossing. As shown, in the embodiment shown the pulse closest to the zero-crossing between the first half-cycle and second half-cycle is broadened from an expected duration (according to the S-PWM modulation) of t1, to an actual duration of t2. In the embodiment shown it is the last pulse prior to the zero-crossing which is modified. Moreover, in the embodiment shown the pulse is broadened symmetrically about its centre. In other embodiments the pulse may be broadened asymmetrically; that is to say, in other embodiments, the start of the pulse may be brought forward by a smaller or greater amount than the end of the pulse is moved later in time. In one or more other embodiments, the start of the pulse may be unchanged relative to its un-broadened state such that the broadening result in a change to the end moment of the pulse without changing its beginning.

The right-hand side shows the effects of broadening the pulse closest to the zero-crossing. On the right-hand side are shown experimental measurements for the use of the S-PWM driver signal in transferring power from a charging device 100 to a receiving device or circuit 200, according to one or more embodiments. Trace 610 shows the S-PWM driver signal which opens and closes switch S1, whilst complimentary switch S2 is opened and closed in opposition to S1 (not shown). The right-hand side of the figure also shows the resulting voltage 620 across the receiver inductor coil 160. During the first half-cycle, the voltage across the coil is generally positive and gradually increasing; during the second half-cycle, the voltage across the coil is generally negative and gradually becoming more negative. At the start of each of the half-cycle, there is a short interval during which the voltage falls back towards zero, however, compared to the conventional method illustrated in FIG. 5, in this case the reduction in the voltage across the receiving coil 160 is itself reduced. Thus, although there remains a temporary reduction in the voltage across the coil, it does not cross zero. As a consequence there are only two zero-crossings per complete cycle and it is straightforward to determine therefrom the modulating wave frequency.

As can be seen from the FIGS. 3 and 4, during any individual half-cycle of the modulating wave in unipolar S-PWM, two of the switches are operating with variable pulse width, and the other two are respectively on and off for the complete half-cycle. As already mentioned, the switching of switches S1 and S2 depicted in FIG. 6 corresponds to S-PWM, in which during a first half-cycle of the modulating wave S1 and S2 are switched with variable pulse width, and during the second half-cycle of the modulating wave, S3 and S4 are switched with variable pulse width (not shown) whilst S1 and S2 are respectively off and on.

From the right-hand side, it can be seen that the voltage across the inductive coil not only does not return across zero during the first half-cycle, as shown at 624 and 628, but also does not return across zero during the second half-cycle, as indicated at 622 and 626. Thus, according to this embodiment the timing of the first and last pulse of switch S3 during the second half-cycle of the modulating wave is modified in the same way that switch S1 is modified during the first half-cycle. In other embodiments, based on the alternative unipolar S-PWM method of FIG. 3, the pulse width modulation is applied to switches S1 and S2 during both half-cycles of the modulating wave; switches S3 and S4 are switched from an off state to an on state, and vice versa only once in each half-cycle, and they may thus be described as the slow, or low-frequency, switches.

Although determination of the frequency of the modulating wave could be simplified to some limited extent by avoiding spurious zero-crossings during only the first half-cycle of each full cycle of the modulating wave, in general it may be preferable to avoid spurious zero-crossings during both first and second half-cycles. Thus, although according to some embodiments of the disclosure the or each pulse closest to the zero-crossing is or are modified only during the first half-cycle, in preferred embodiments the or each pulse closest to the zero-crossing is or are modified in both the first and the second half-cycles.

Figure 7:
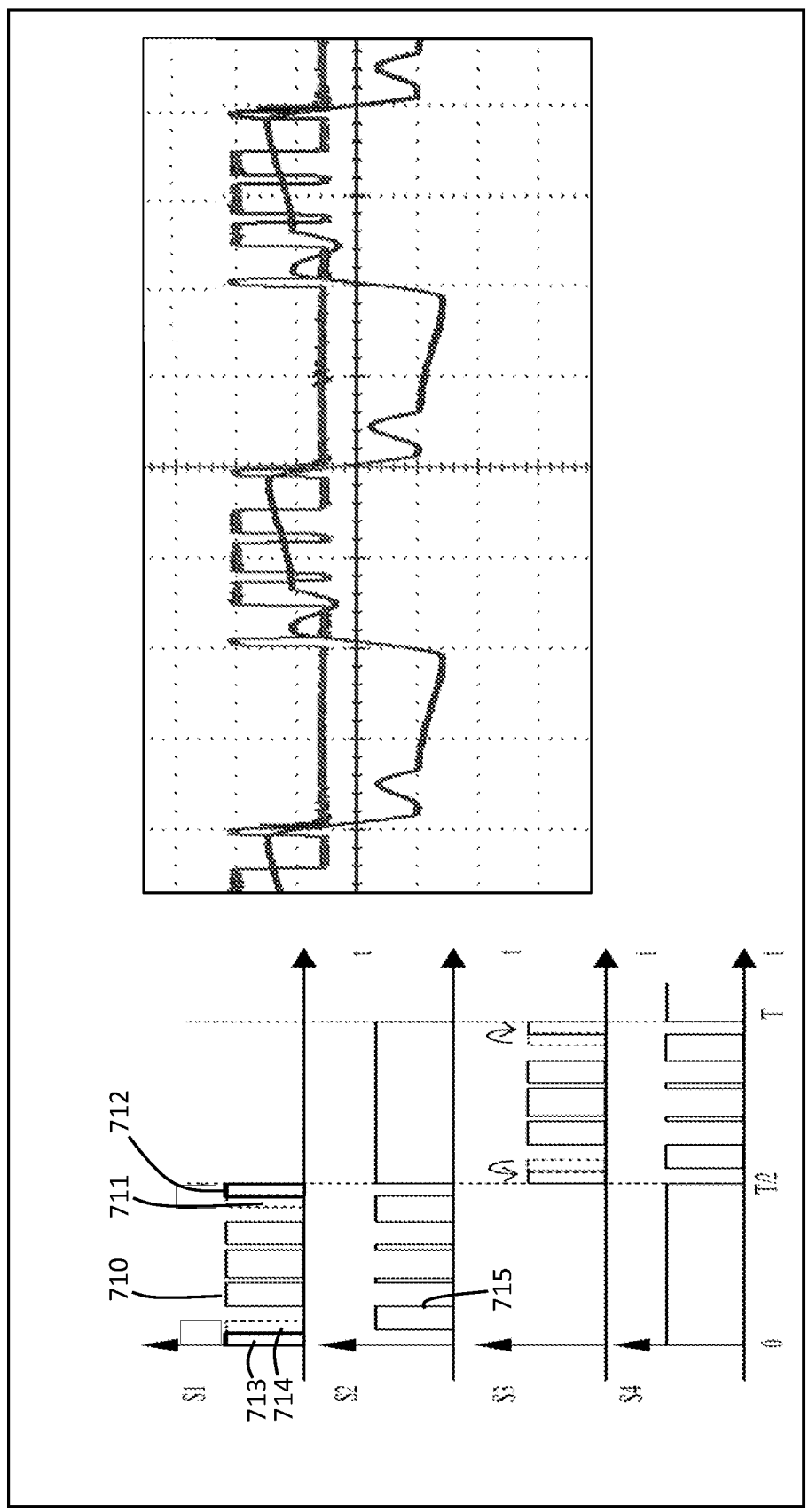
FIG. 7 illustrates switch control to provide an AC output by means of S-PWM, along with the voltage obtainable in a receiver coil of a wireless charging system wherein the transmitter coil is powered by current driven by a modified S-PWM according to one or more other embodiments

FIG. 7 shows, on the left-hand side, the S-PWM driver signals for S1 and S2, and on the right-hand side experimental measurements of S1 and the resulting voltage across the receiver coil, for a wireless charger operating according to one or more other embodiments of the present disclosure.

Shown on the left-hand side, the S-PWM driver signals 710 and 715 for switches S1 and S2 respectively, are again similar to those in the conventional method, over most of the modulating wave cycle. However, the M-PWM driver signal adjacent a zero-crossing of the periodic modulating wave is modified by reducing an interval or delay between the zero-crossing and at least one pulse of the M-PWM driver signal closest to the zero-crossing. In the embodiment or embodiments shown according to FIG. 7, this reduction is achieved by exchanging a pulse closest to the zero-crossing of the modulating wave with the off-time between that pulse and the zero-crossing. According to the embodiment shown in FIG. 7, the first pulse or on-time 513 of the unmodified or conventional S-PWM is replaced by an off-period, 714, and the off-period 514 is replaced by a first on-period or pulse 713.

As shown in FIG. 7, according to one or more embodiments both the first pulse 513 after a zero-crossing of the modulating wave, and a last pulse 511 prior to a zero-crossing of the modulating wave are both exchanged with their respective off-periods 712 and 714; in one or more other embodiments only the first pulse 713 is exchanged with its respective off-time, although this would result in an increase in the asymmetry, which as discussed above is generally less preferred.

In general the width or duration of the pulse closest the zero-crossing will be different from and typically longer than the duration of the off-period between it and the zero-crossing. Thus, considering the first pulse 513, in the embodiments illustrated in FIG. 7, the modified first pulse 713, which starts at the zero-crossing moment itself, will generally have shorter duration than the unmodified pulse 513. However, in other embodiments the width of the first pulse 513 is not changed, but the pulse (713) is rather displaced in time (relative to 513) such that it starts at the zero-crossing.

Figure 8:
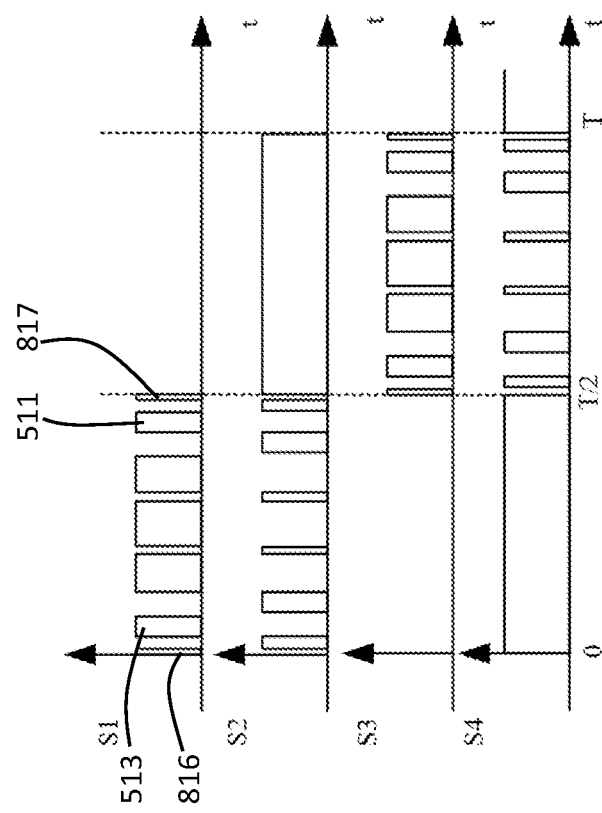
FIG. 8 illustrates switch control to provide output by means of S-PWM, according to yet other embodiments.

Turning now to FIG. 8, this shows switch control to provide an output by means of S-PWM, according to yet other embodiments. Consider first the first half cycle of the modulating wave (from 0 to T/2). In this case, the first and last pulses 513 and 511 are not modified, but an additional pulse 816 is introduced within the off-time prior to the first pulse; further another additional pulse 817 may be introduced within the off-time after the last pulse. The additional pulse 816 may start immediately at the zero crossing as shown, or may be delayed relative to the zero crossing itself. Similarly, the additional pulse 817 may end at the zero crossing as shown, or may be advanced relative to the zero crossing itself, so as to leave a smaller off-time immediately prior to the zero-crossing.

Corresponding additional pulse or pulses are introduced, during the second half cycle of the modulating wave (from T/2 to T), to the control signals for switches S3 and S4.

The skilled person will appreciate that the embodiments discussed above may be implemented in hardware or software or a combination of both. In particular there may be provided a PWM driving apparatus for a wireless charger, which is configured to generate a multiple PWM or a S-PWM signal, having an modification to the one or each pulse of a switch driver which is closest to a zero-crossing of the modulating wave, wherein the modulating wave determines the frequency of the current through a coil in the wireless charger which is coupled to a coil in a device to be charged in order to transfer powers thereto.

As mentioned above, the driving apparatus may be configured to operate at two or more different frequencies of the modulating wave. In particular, the apparatus may be configured to encode data by shifting between the modulating frequencies using a protocol such as frequency shift keying, FSK. Embodiments of the present disclosure may simplify determination, by the receiving device, of the frequency of the modulating wave, since spurious zero-crossings may be reduced or eliminated. FSK demodulation for decoding the data encoded thereby may thus be simplified. Embodiments of the present disclosure may therefore enhance communication or data transfer from the charging device to the receiver.

From reading the present disclosure, other variations and modifications will be apparent to the skilled person. Such variations and modifications may involve equivalent and other features which are already known in the art of multiple PWM and S-PWM in particular and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method for wireless power transfer using a multiple pulse width modulation (M-PWM) driver signal, comprising:
   generating the M-PWM driver signal wherein the pulse width varies in accordance with the magnitude of a periodic modulating curve;
   modifying the M-PWM driver signal adjacent a zero-crossing of the periodic modulating wave, by reducing an interval between the zero-crossing and at least one pulse of the M-PWM driver signal closest to the zero-crossing; and
   using the modified M-PWM driver signal to open and close a switch in a wireless power transfer charging circuit.

2. The method of claim 1, wherein the at least one pulse of the M-PWM driver signal closest to the zero-crossing, comprises a first pulse subsequent to the zero-crossing.

3. The method of claim 2, wherein at least one pulse of the M-PWM driver signal closest to the zero-crossing comprises both a last pulse prior to the zero-crossing and the first pulse subsequent to an immediately preceding zero-crossing.

4. The method of claim 1, wherein the periodic modulating curve is a sinusoidal curve and the multiple PWM signal is a sinusoidal PWM (S-PWM) signal.

5. The method of claim 1, wherein reducing an interval between the zero-crossing and a pulse of the M-PWM driver signal closest to the zero-crossing comprises broadening a width of the pulse closest to the zero-crossing.

6. The method of claim 5, wherein broadening the width of the pulse closest to the zero-crossing comprises symmetrical broadening about its un-broadened state.

7. The method of claim 1, wherein reducing an interval between the zero-crossing and a pulse of the M-PWM driver signal closest to the zero-crossing comprises adjusting the timing of the pulse closest to the zero-crossing.

8. The method of claim 1, wherein reducing an interval between the zero-crossing and a pulse of the M-PWM driver signal closest to the zero-crossing comprises exchanging the pulse closest to the zero-crossing with an off-time immediately adjacent the zero-crossing.

9. The method of claim 1, wherein reducing an interval between the zero-crossing and a pulse of the M-PWM driver signal closest to the zero-crossing comprises introducing an additional pulse in an off-time immediately adjacent the zero-crossing.

10. The method of claim 1, further comprising using an inverse of the modified M-PWM driver signal to open and close a second switch in the wireless power transfer charging circuit.

11. A method comprising
applying the method of claim 1 for a first half-cycle of the modulating curve, and
for the entirety of an immediately subsequent half-cycle of the modulating curve keeping the first switch open.

12. The method of claim 1, wherein the wireless power transfer charging circuit comprises an inverter and the switch is comprised in the inverter.

13. A controller for a wireless power charging circuit, the wireless power charging circuit comprising an inverter, wherein the controller is configured to
generate a sinusoidal pulse width modulation (S-PWM) driver signal wherein the pulse width varies in accordance with the magnitude of a periodic modulating curve; and
modify the S-PWM driver signal adjacent a zero-crossing of the periodic modulating wave, by reducing an interval between the zero-crossing and at least one pulse of the S-PWM driver signal closest to the zero-crossing, wherein the modified S-PWM driver signal is configured to open and close a switch of the inverter.

14. The controller of claim 13,
further comprising a driver circuit configured to use the modified S-PWM driver signal to open and close the switch.

15. A wireless power charging circuit, comprising:
the controller and the inverter of claim 13.

16. A controller for a wireless power charging circuit, the wireless power charging circuit comprising an inverter, wherein the controller is configured to:
generate a multiple pulse width modulation (M-PWM) driver signal wherein the pulse width varies in accordance with the magnitude of a periodic modulating curve; and
modify the M-PWM driver signal adjacent a zero-crossing of the periodic modulating wave, by reducing an interval between the zero-crossing and at least one pulse of the M-PWM driver signal closest to the zero-crossing, wherein the modified M-PWM driver signal is configured to open and close a switch of the inverter.

17. The controller of claim 16, wherein the periodic modulating curve is a sinusoidal curve and the M-PWM driver signal is a sinusoidal pulse width modulation (S-PWM) driver signal.

18. The controller of claim 16, wherein reducing an interval between the zero-crossing and a pulse of the M-PWM driver signal closest to the zero-crossing comprises broadening a width of the pulse closest to the zero-crossing.

19. The controller of claim 16, wherein reducing an interval between the zero-crossing and a pulse of the M-PWM driver signal closest the zero-crossing comprises adjusting the timing of the pulse closest to the zero-crossing.

20. The controller of claim 16, wherein reducing an interval between the zero-crossing and a pulse of the M-PWM driver signal closest the zero-crossing comprises exchanging the pulse closest to the zero-crossing with an off-time immediately adjacent the zero-crossing.

21. The controller of claim 16, wherein the at least one pulse of the M-PWM comprises a first pulse subsequent to the zero-crossing.

22. The controller of claim 21, wherein the at least one pulse of the M-PWM further comprises a last pulse prior to the zero-crossing.

23. A wireless power charging circuit, comprising:
the controller and the inverter of claim 16.

* * * * *